United States Patent [19]
Heller

[11] Patent Number: 5,617,538
[45] Date of Patent: Apr. 1, 1997

[54] MESSAGE TRANSFER SYSTEM AND METHOD FOR PARALLEL COMPUTER WITH MESSAGE TRANSFERS BEING SCHEDULED BY SKEW AND ROLL FUNCTIONS TO AVOID BOTTLENECKS

[75] Inventor: Steven K. Heller, Derry, N.H.

[73] Assignee: TM Patents, L.P., Wilmington, Del.

[21] Appl. No.: 249,653

[22] Filed: May 26, 1994

Related U.S. Application Data

[63] Continuation of Ser. No. 724,652, Jul. 2, 1991, abandoned.

[51] Int. Cl.$^6$ ............................................ G06F 13/00
[52] U.S. Cl. ............................ 395/200.02; 395/823
[58] Field of Search .......................... 395/200, 325, 395/800, 200.02, 823; 370/60, 92, 93; 340/825.52

[56] References Cited

U.S. PATENT DOCUMENTS

| | | | |
|---|---|---|---|
| 3,893,084 | 7/1975 | Kotok et al. | 395/425 |
| 3,980,874 | 9/1976 | Vora | 364/746 |
| 4,189,767 | 2/1980 | Ahuja | 395/425 |
| 4,202,035 | 5/1980 | Lane | 395/400 |
| 4,272,819 | 6/1981 | Katsumata et al. | 395/200 |
| 4,433,389 | 2/1984 | York et al. | 395/400 |
| 4,511,958 | 4/1985 | Funk | 395/325 |
| 4,543,627 | 9/1985 | Schwab | 395/200 |
| 4,649,473 | 3/1987 | Hammer et al. | 395/200 |
| 4,888,726 | 12/1989 | Struger et al. | 395/200 |
| 4,920,484 | 4/1990 | Ramade | 395/200 |
| 4,984,151 | 1/1991 | Dujari | 395/775 |
| 5,097,412 | 3/1992 | Orimo et al. | 395/500 |
| 5,166,931 | 11/1992 | Riddle | 370/94.1 |
| 5,167,035 | 11/1992 | Mann et al. | 395/525 |

OTHER PUBLICATIONS

D. Lawrie, "Access And Alignment Of Data in an Array Processor," IEEE Transactions on Computers, vol. C–24, No. 12, Dec. 1975, pp. 1145–1155.

D. Chang, et al., "On the Effective Bandwidth of Parallel Memories," IEEE Transactions On Computers, vol. C–26, No. 5, May, 1977, pp. 480–490.

P–C. Yew, et al., "Distributing Hot–Spot Addressing In Large–Scale Multiprocessors," IEEE Transactions on Computers, vol. C–36, No. 4, Apr., 1987, pp. 388–395.

*Primary Examiner*—Krisna Lim

[57] ABSTRACT

A computer system comprises a plurality of processing elements interconnected by a communications network. The communications network has a series of network addresses each identifying a location in the network, each processing element has an associated network address in the series. The communications network transfers messages transmitted by the processing elements in accordance with a respective address portion associated with each message, thereby to transfer the messages among the processing elements. Each processing element includes a message generator and a message transmitter. The message generator generates, during a message transfer operation, a series of messages for transmission over the communications network to others of the processing elements in the system, each message having an address portion whose contents enable the communications network to transfer the message from the processing element generating the message to a processing element to receive the message. The message generator generates the messages such that address portions of the successive messages in the series are transferred to processing elements having successive network addresses. The message transmitter iteratively transmits the series of messages generated by the message generator, the message transmitters of the processing elements which have successive network addresses selecting, as initial messages to be transmitted, messages having address portions to be transmitted to processing elements which have succeeding network addresses, thereby to effect a skewing of the messages transferred over the communications network.

21 Claims, 2 Drawing Sheets

30. HOST ESTABLISHES MEMORY LOCATION IDENTIFICATION PARAMETERS "U," "V" AND "W" FOR USE DURING TRANSFER OPERATION. PARAMETERS "U" AND "W" ARE ESTABLISHED TO BE RELATIVELY PRIME WITH RESPECT TO THE NUMBER OF MESSAGES TO BE TRANSFERRED

31. HOST TRANSMITS PARAMETERS "U," "V" AND "W," TO PROCESSING ELEMENTS, ALONG WITH THE NUMBER "M" OF MESSAGES TO BE TRANSFERRED

32. HOST INITIALIZES AN ITEM TRANSFER INDEX " t "

33. HOST ENABLES PROCESSING ELEMENTS TO USE PARAMETERS "U," "V" AND "W," PROCESSING ELEMENT IDENTIFICATION "p" AND NUMBER "M" OF MESSAGES TO BE TRANSFERRED, TO IDENTIFY MEMORY STORAGE LOCATION OF FIRST MESSAGE TO BE TRANSFERRED
$$S_0 = V + WUp \ (mod \ M)$$

34. HOST ENABLES PROCESSING ELEMENTS TO TRANSFER MESSAGE FROM IDENTIFIED MEMORY STORAGE LOCATION

35. HOST USES ITEM TRANSFER INDEX " t " AND NUMBER "M" OF MESSAGES TO BE TRANSFERRED TO DETERMINE WHETHER ALL MESSAGES HAVE BEEN TRANSFERRED — NO

↓ YES

40. EXIT

36. HOST INCREMENTS ITEM TRANSFER INDEX " t "

37. HOST ENABLES PROCESSING ELEMENTS TO USE PARAMETER "W," AND PREVIOUS MEMORY STORAGE LOCATION IDENTIFICATION TO IDENTIFY MEMORY STORAGE LOCATION CONTAINING NEXT MESSAGE TO BE TRANSFERRED
$$S_t = S_{t-1} + W \ (mod \ M)$$

FIG. 2

MESSAGE TRANSFER SYSTEM AND METHOD FOR PARALLEL COMPUTER WITH MESSAGE TRANSFERS BEING SCHEDULED BY SKEW AND ROLL FUNCTIONS TO AVOID BOTTLENECKS

This is a continuation of application Ser. No. 07/724,652, filed Jul. 2, 1991, now abandoned.

FIELD OF THE INVENTION

The invention relates generally to the field of digital computer systems, and more particularly to massively parallel computing systems. The invention particularly provides an arrangements for controlling processors in a computing system having a large number of processors to facilitate the transfer of data thereamong.

BACKGROUND OF THE INVENTION

A digital computer system generally comprises three basic elements, namely, a memory element, an input/output element and a processor element. The memory element stores information in addressable storage locations. This information includes data and instructions for processing the data. The processor element fetches information from the memory element, interprets the information as either an instruction or data, processes the data in accordance with the instructions, and returns the processed data to the memory element. The input/output element, under control of the processor element, also communicates with the memory element to transfer information, including instructions and the data to be processed, to the memory, and to obtain processed data from the memory.

Most modern computing systems are considered "von Neumann" machines, since they are generally constructed according to a paradigm attributed to John von Neumann. Von Neumann machines are characterized by having a processing element, a global memory which stores all information in the system, and a program counter that identifies the location in the global memory of the instruction being executed. The processing element executes one instruction at a time, that is, the instruction identified by the program counter. When the instruction is executed, the program counter is advanced to identify the location of the next instruction to be processed. (In many modern systems, the program counter is actually advanced before the processor has finished processing the current instruction.)

Von Neumann systems are conceptually uncomplicated to design and program, since they do only one operation at a time. In von Neumann systems, a single instruction stream operates on a single data stream. That is, each instruction operates on data to enable one calculation at a time. Such processors have been termed "SISD," for single-instruction/single-data." If a program requires a segment of a program to be used to operate on a number of diverse elements of data to produce a number of calculations, the program causes the processor to loop through that segment for each calculation. In some cases, in which the program segment is short or there are only a few data elements, the time required to perform such a calculation may not be unduly long.

However, for many types of such programs, SISD processors would require a very long time to perform all of the calculations required. Accordingly, processors have been developed which incorporate a large number of processing elements all of which may operate concurrently on the same instruction stream, but with each processing element processing a separate data stream. These processors have been termed "SIMD" processors, for "single-instruction/multiple-data."

Typical SIMD systems include a SIMD array, which includes the elements and an interconnection network, a control processor or host, and an input/output component. The input/output component, under control of the control processor, enables data to be transferred into the array for processing and receives processed data from the array for storage, display, and so forth. The control processor also controls the SIMD array, iteratively broadcasting instructions to the processing elements for execution in parallel. The interconnection network enables the processing elements to communicate the results of a calculation to other processing elements for use in future calculations.

Several interconnection networks have been used in SIMD arrays and others have been proposed. In one interconnection network, the processing elements are interconnected in a matrix, or mesh, arrangement. In such an arrangement, each processing element is connected to, and communicates with, four "nearest neighbors" to form rows and columns defining the mesh. This arrangement can be somewhat slow if processing elements need to communicate among themselves at random. However, the arrangement is inexpensive and conceptually simple, and may suffice for some types of processing, most notably image processing. The "Massively Parallel Processor" manufactured by Goodyear Aerospace Corporation is an example of a SIMD array having such an interconnection network.

In another interconnection network, processing elements are interconnected in a cube or hypercube arrangement, having a selected number of dimensions, for transferring data, in the form of messages, among the processing elements. The arrangement may be described as a "cube" if it only has three dimensions, and a "hypercube" if it has more than three dimensions. U.S. Pat. No. 4,598,400, entitled Method and Apparatus For Routing Message Packets, issued Jul. 1, 1986 to W. Daniel Hillis, and assigned to the assignee of the present application, describes a system having a hypercube network. In the system described in the '400 patent, multiple processing elements are connected to a single node, and the nodes are interconnected in the hypercube.

Another interconnection network which has been proposed is a crossbar switch, through which each processing element can communicate directly with any of the other processing elements. However, the number of switching elements corresponds to the square of the number of processing elements. Accordingly a crossbar switch also has the most connections and switching elements, and thus is the most expensive and also the most susceptible to failure due to broken connections and faulty switching elements. Thus, crossbar switch arrangements are rarely used, except when the number of processing elements is fairly small.

Yet other interconnection networks include butterfly networks and trees. In a butterfly network, switching is performed through a number of serially-connected stages, each including one or more switching elements. Each switching element has a selected number of inputs, each connected to the outputs of switching elements of a prior stage or outputs of processing elements, and a corresponding outputs which may be connected to the inputs of a subsequent stage or of processing elements. The "Butterfly" computer system manufactured by Bolt Beranek & Newman uses such a network. A number of other interconnection networks, such as a Benes network, have been developed based on the butterfly network. In a tree network, switches are interconnected in the form of a tree, with a single switch at the "root," expanding at each successive stage to a plurality of switching stages at the "leaves." The processing elements may be connected to switching stages only at the leaves, or they may be connected at switching stages throughout the network.

Parallel machines may be used to perform mathematical operations on vectors or matrices of data values. In many algorithms involving matrices, it is typically advantageous to have each processing element process data items representing a column of a matrix, with successive processing elements in the processing array processing the successive columns of the matrix. That is, if "$a_{ij}$" represents a location of a data item in a matrix, with "i" and "j" comprising row and column indices, respectively, then processing element "X" of the processing array processes all of the data items "$a_{xj}$" of the matrix. Typically, each processing element will have a memory, with the data items "$a_{x,0}$" through "$a_{x,Y}$" of the successive rows zero through "Y" in the column "X" it is processing being stored in successive storage locations in its memory.

In matrix algorithms, it is often necessary to perform a transpose operation, in which the data items of the columns are reorganized into rows. Otherwise stated, in a transpose operations the data items in matrix locations "$a_{ij}$" are transferred to matrix locations "$a_{j,i}$," that is, the data item in the "j-th" memory location of the "i-th" processing element is moved to the "i-th" memory location of the "j-th" processing element. If a matrix is large, the time required to determine an optimal sequence for moving the data items among processing elements can be quite large.

In one arrangement for performing a transpose operation, each processing element may transmit the data items from the sequential matrix locations to the intended destination processing elements. In such an arrangement, all of the processing elements will contemporaneously transmit data items from their first locations $a_{i,0}$ to the same processing element, namely processing element "0". Thereafter, all processing elements will transmit data items from their second locations $a_{i,1}$ to processing element "1," and so forth. Under such an arrangement, the time required to perform a transpose operation can be quite lengthy, since it normally takes some time for each processing element to receive the data items from all of the other processing elements.

U.S. patent application Ser. No. 07/707,366 filed May 30, 1991, in the name of Alan S. Edelman, entitled Massively Parallel Processor Including All-To-All Personalized Communication Arrangement, and assigned to the assignee of the present application, describes an arrangement for performing a transpose operation in connection with a system in which processing elements are interconnected by a routing arrangement in the form of a hypercube of "d" dimensions. In that system, which includes $2^d$ processing elements each having a like number of data items, the transpose operation is performed in $2^d$ steps, which is a minimal number of steps for performing a transpose operation. The arrangement makes use of a number of symmetry properties of a hypercube, however, and may not be applicable to other types of interconnection networks. In addition, the arrangement is generally limited to transfer operations in connection with sets of data items in which the number of data items in a set is a power of two.

A parallel processing system often performs similar message transfer operations to transfer data items among the processing elements for a number of reasons. For example, often when transferring data from a serial input/output device, such as a disk or tape device, into a parallel processor, the data as it is distributed from the input/output device to the processing elements needs to be reorganized among the processing elements before processing starts. A similar operation may be required after the data has been processed and before the processed data is transferred to the serial input/output device or a display device such as a frame buffer. Depending on the organization of the data on the input/output device and the desired organization among the processing elements, the operation may comprise one or a number of transpose-like operations.

Similarly, in image processing operations involving, for example, image data defining an n-dimensional image, the processing elements are organized in an n-dimensional pattern may be assigned to process a particular picture element ("pixel") or volume element ("voxel") of the image. The data for the pixels or voxels is distributed to the processing elements assigned thereto. In performing the image processing, it is often desired to rotate the data, which requires transferring the data to other processing elements in a regular pattern to represent the rotation.

SUMMARY OF THE INVENTION

The invention provide a new and improved message transfer scheduling arrangement for massively parallel computer.

In brief summary, the invention provides a computer system comprising a plurality of processing elements interconnected by an interconnection network and controlled by a control arrangement. Each processing element includes a processor and a data store having a plurality of storage locations each including a message to be transmitted among the processing elements. The control arrangement enables the processors to iteratively select storage locations in their respective data stores and transfer the messages over the interconnection network. The control arrangement enables the processors to select the respective storage locations in accordance with a composite of a roll function and a skew function.

In another aspect, the invention provides a method of controlling a system including a plurality of processing elements and interconnected by an interconnection network, each processing element each having a processing element identification including a plurality of storage locations each including a message to be transmitted over an interconnection network among the processing elements. The method enables the processing elements to identify storage locations whose messages are to be transferred in a sequence over the interconnection network. First, a skew parameter and a roll parameter are selected. Thereafter, for a first message, the processing elements are enabled to generate respective initial offset value identifying the storage location whose contents are to be transferred over the interconnection network in a first message, the initial offset value comprising a function of the skew parameter, the roll parameter and the processing element identification. For each subsequent messages, the processing elements are enabled to generate respective offset values identifying the storage location whose contents are to be transferred over the interconnection network, each offset value comprising a function of the roll parameter and the previous offset value.

In yet another aspect, the invention provides a computer system comprising an interconnection network for facilitating the transfer of messages and a plurality of processing elements, each generating messages for transfer by the interconnection network. Each processing element includes a processor and a data store having a plurality of storage locations, each including a message to be transmitted among the processing elements. Each processing element iteratively selects storage locations in its respective data store and transfer the messages over the interconnection network, the storage location selection being performed in accordance with a composite of a roll function and a skew function.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 is a flow diagram helpful in understanding the operation of the message transfer scheduling arrangement.

DETAILED DESCRIPTION OF AN ILLUSTRATIVE EMBODIMENT

Figure 1:
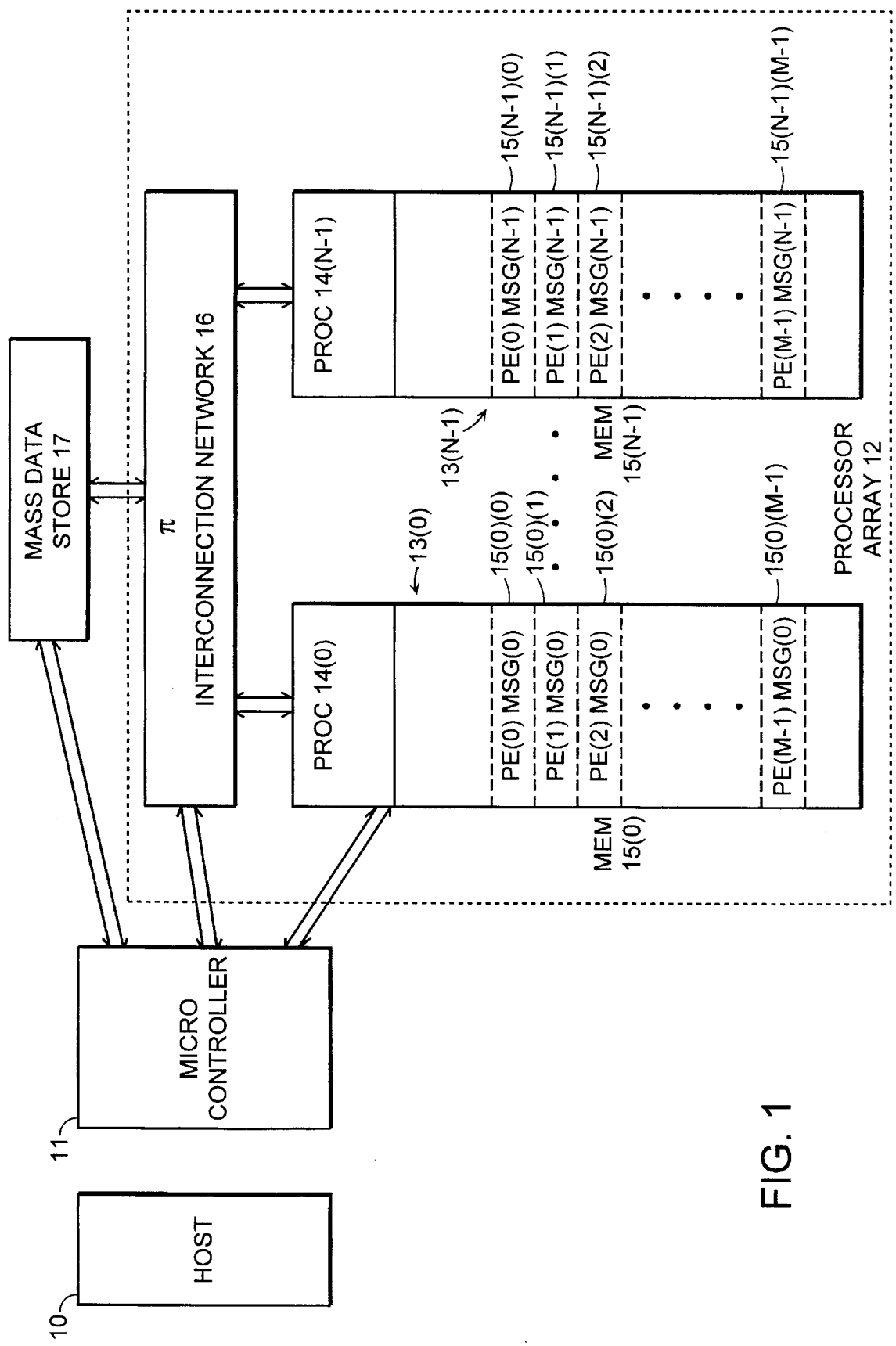
FIG. 1 is a general block diagram of a massively parallel computing system constructed in accordance with the invention.

With reference to FIG. 1, a massively parallel computer constructed in accordance with the invention includes a host 10 which transmits commands to a microcontroller 11 to control processing by a processor array 12. The processor array 12 includes a number of processing elements 13A through 13N [generally identified by reference numeral 13($i$)], each including a processor 14($i$) and a memory 15($i$). The micro-controller 11 transmits control signals that enable the processors 14($i$) to, in parallel, process items of data in their respective memories 15($i$). In one embodiment, the addresses of locations in the memories 15($i$) to be processed by the processors 14($i$) can be selectively provided either by the micro-controller 11, or they may be generated and maintained locally at each of the processors 14($i$). The control signals provided by the micro-controller 11 enable the processors 14($i$) to use either the locally-generated addresses or addresses provided by it in identifying locations containing data to be processed.

The processor array 12 also includes an interconnection network 16 which, under control of the micro-controller 11, transfers data among the processing elements 13($i$) and between the processing elements 13($i$) and a mass data store 17. In one embodiment, the mass data store 17 generally stores data from the processing elements 13($i$) organized in rows. That is, the mass data store 17 stores, in a group of successive storage locations, an item from all processors 14($i$), with successive groups storing differing items. In that embodiment, a unit of storage in the mass data store 17 effectively comprises a group of storage locations in the mass data store 17, so that the mass data store 17 transfers an integral number of items to the processing elements 14($i$) in one transfer operation. It will be appreciated that the data in other embodiments of the mass data store 17 may be organized in a number of ways, and that a character recognition system in accordance with the invention may be implemented in a massively parallel computer which does not include a mass data store 17.

Each of the processing elements 13($i$) transmits a sequence of messages stored in sequential storage locations 15($i$)($j$) in its memory 15($i$) to all of the other processing elements 13($k$)("k" not equal to "i"). Each message includes an address, which identifies a destination processing element, that is, a processing element to which the message is to be transmitted, and a data item. Each message is identified by the legend PE(x) MSG(y), where "x" identifies the destination processing element 13($k$) and "y" identifies the storage location 15($k$)($y$) in the memory 15($k$) of the destination processing element 13($k$) in which the data item is to be stored. It will be appreciated that the index "y" in the data item identification PE(x) MSG(y) also corresponds to the index "i" of the processing element 13($i$) which constitutes the source of the message.

The micro-controller 11, in response to commands from the host 10, initiates a message transfer operation during which it transmits control signals to the processing elements 13($i$) and interconnection network 16 concurrently enabling the processing elements 13($i$) to transmit respective messages PE(x) MSG(y). The message transfer operation proceeds a plurality of transfer iterations. In each iteration, each processing element 13($i$) transmits a message from a storage location 15($i$)($j$) as selected by the processor 14($i$), and the messages are received by the respective destination processing elements 13($j$). It will be appreciated that at least some of the destination processing elements 13($j$) may also constitute transmitting processing elements 13($i$). The micro-controller 11 repeats the iterations until messages containing all of the data items have been transmitted and received.

In accordance with the new message transfer scheduling arrangement, each processing element 13($i$) selects storage locations 15($i$)($j$) whose messages are to be transmitted in accordance with several parameters, a processor identification value "p" and a value "M" identifying the number of messages to be transferred by a processing element 13($i$). It will be appreciated that the processor identification value "p" may correspond to the index "i" in reference numeral 13($i$). These values are used by each processing element 13($i$) to establish:

(a) an initial value which is used to provide initial offset pointer, from the base storage location 15($i$)(0), to the storage location 15($i$)($j$) in the memories 15($i$) containing the first message to be transferred, and (b) an increment value to be used in determining offset pointers to be used in subsequent transfer iterations.

For each transfer iteration "t" after the first, the increment value is used in conjunction with the initial value and the value "M" identifying the number of messages to be transferred to produce a value used as an offset pointer to the storage location containing the message PE(x) MSG(y) to be transferred in a message during that transfer iteration.

The parameters, identified herein as "U," "V" and "W," are selected in relation to the number of processing elements 13($i$) and the number "M" of messages to be transferred by a processing element 13($i$), to minimize congestion that may develop in the interconnection network 16 and also to ensure that the values will provide pointers to enable all messages to be transferred. More particularly, one parameter, namely, parameter "V," is used by all of the processing elements 13($i$) to provide a global offset component of the initial offset value. In addition, the processing elements 13($i$) use parameters "U" and "W" along with their respective the processor identification values "p" as factors in generating respective processing element-specific components that are used, in conjunction with the global offset component, to generate values used as initial offset pointer for the first transfer. That is, the value used as the initial offset pointer is:

$$S_0 = V + WUp \pmod{M} \qquad \text{[Eqn. 1]}$$

where "mod M" refers to taking the sum modulo the value "M", the number of messages to be transferred by a processing element 13(i). This ensures that the initial offset pointer points to one of the "M" sequential storage locations containing messages PE(x) MSG(y) to be transferred.

In addition, each processing element 13(i) uses one of the parameters, namely, parameter "W," as the increment value during subsequent transfer iterations. Thus, for each transfer iteration after the first, the offset pointer generated by each processing element 13(i) will be $$S_t = S_{t-1} + W(\text{mod } M) \quad \text{[Eqn. 2]}.$$

Here also, talking the sum modulo the number of messages to be transferred by a processing element 13(i) ensures that the offset pointer points to one of the "M" sequential storage locations containing messages PE(x) MSG(y) to be transferred.

The parameter "V" may be selected to have any value, without relation to either the number of processing elements 13(i) or the number "M" of messages to be transferred.

On the other hand, the values of parameters "U" and "W" have particular relations in connection with the number "M" of messages to be transferred. In particular, the value of parameter "W" is selected to be relatively prime with respect to the value "M" identifying the number of messages to be transferred by a single processing element 13(i). That is, the value of parameter "W" is selected so that it and the value of "M" are both divisible only by the value "one." This will ensure that the sequence of offset pointer values generated by a processing element 13(i) during successive transfer iterations will identify different storage locations in the respective memory 15(i), until all of the messages PE(x) MSG(y) to be transferred have been transferred.

In addition, the value of parameter "U" is normally selected to be relatively prime with respect to the value of "M." Thus, the value for parameter "U" is also selected so that it and the number of processing elements 13(i) are divisible only by the value "one." This relation, in conjunction with the relation noted above in connection with parameter "W," provides that nearby processing elements 13(i) will have widely distributed initial offset values.

The determination of offset values as described above actually involves the composition of one function, namely, a roll function, over a second, skew, function. In the absence of either the skew function or the roll function, during a message transfer operation the processing elements 13(i) may begin transmitting messages using messages PE(0) MSG(y) from the first storage locations 15(i)(0) in their respective memories 15(i), and thereafter sequence through the storage locations 15(i)(j) in order until messages including all of the messages PE(x) MSG(y) have been transmitted. In such an arrangement, it will be appreciated that since at least a large number of the processing elements 13(i) would be contemporaneously transmitting messages to the same destination processing element 13(j), the destination processing element 13(j) would represent a bottleneck in the message transfer operation. Furthermore, it will be appreciated that processing elements 13(i) would be transmitting messages first to one destination processing element 13(j), then to the next destination processing element 13(j+1), and so forth, which would be proximate each other in the interconnection network 16. As a result, the interconnection network 16 could also become quite congested.

With the skew function, the processing elements 13(i) would begin transmitting messages PE(x) MSG(y) generally in different storage locations 15(i)(j). In particular, pursuant to the skew function, each processing element 13(i) selects a storage location 15(i)(j) offset from the base 15(i)(0) by an amount corresponding to a skew parameter, which is "U," multiplied by the processor identification value "p," modulo "M," the number of messages PE(x) MSG(y) to be transmitted. As a result, the destination processing elements 13(j) for the respective messages transmitted by the processing elements 13(i) would be scattered throughout the system, and would no longer represent a bottleneck. Since skewing parameter "U" is selected to be relatively prime with respect to the number "M" of messages to be transferred, the initial offsets for each processing element 13(i) will be widely dispersed. In particular, the initial offsets for the different processing elements 13(i) will all be different, as long as the number of processing elements 13(i) is less than or equal to the number of messages "M" to be transmitted.

With the skew function alone, the destination processing elements 13(i) would constitute less of a bottleneck, but the interconnection network 16 may still get congested, since each would be transmitting messages to sequential destination processing elements 13(j). The roll function reduces this effect. Pursuant to the roll function, each processing element 13(i) increments the storage location offset by the parameter "W." If the value of the roll parameter "W" is greater than "one," the sequential messages transmitted by the processing elements 13(i) will be spread out among the destination processing elements 13(j), reducing the likelihood that the interconnection network 16 will become congested. The value of the roll parameter "W" is selected to be relatively prime with respect to the number of messages PE(x) MSG(y) to be transferred. This, plus the use of the roll parameter "W" in producing the initial storage location offset value in Eqn. 1, ensures that the incrementation of the storage location offset in Eqn. 2 will provide different offsets until all of the messages have been transmitted.

With this background, the operations performed by the system depicted in FIG. 1 during a transfer operation will be described with respect to FIG. 2. With reference to FIG. 2, the host 10 initially establishes the memory location identification parameters "U," "V" and "W" (step 30). As described above, "U" is a skew parameter and "W" is a roll parameter, both of which are relatively prime with respect to the number of messages PE(x) MSG(y) to be transferred. "V" is a global initial offset value, and may have any value. Thereafter, the host 10 enables the microcontroller 11 to transmit the values of the parameters to the processing elements 13(i), along with the number "M" of messages PE(x) MSG(y) to be transferred (step 31). In one embodiment, each of the processing elements 13(i) is generally provided with its identification value "p" and so neither the host 10 nor the micro-controller 11 need provide that value. The host 10 also initializes an item transfer index "t," which will be used as a running counter to identify the number of messages PE(x) MSG(y) transmitted (step 32).

Thereafter, the host 10 enables the processing elements 13(i) to use the parameters "U," "V" and "W," along with their respective processing element identification values "p" and the number "M" of messages PE(x) MSG(y) to be transferred, to generate their respective initial skewed offset values "$S_0$," pursuant to Eqn. 1 above, to identify the respective storage location 15(i)(j) whose messages PE(x) MSG(y) is the first to be transmitted thereby (step 33). Thereafter, the host 10 enables the processing elements 13(i) to generate respective messages using the message PE(x) MSG(y) from the identified storage location 15(i)(j) and transmit them (step 34).

The host 10 then compares the message transfer index "t" and the number "M" of messages to be transferred to determine whether all of the messages have been transferred (step 35). If not, the host 10 sequences to step 36 to increment the item transfer index "t," and thereafter it enables the processing elements 13(i) to generate the storage location identification value "$S_1$" pursuant to Eqn. 2, above, to identify the storage location 15(i)(u) whose message PE(x) MSG(y) is to be transferred (step 37). As is apparent with respect to Eqn. 2, the processing elements 13(i) generate the storage location identification value "$S_1$" by adding the roll parameter value "W" to the previous storage location identification value $S_0$, and taking the sum modulo the number "M" of messages to be transferred. The host 10 then sequences to step 34 to enable the processing elements 13(i) to generate respective messages using the message PE(x) MSG(y) from the identified storage location 15(i)(j) and transmit them.

The host 10 and processing elements 13(i) iteratively perform steps 34 through 37 until the host 10 determines in step 35 that the value of the message transfer index "t" corresponds to the number "M" of messages to be transferred. At that point, all of the messages PE(x) MSG(y) have been transferred, and so the host sequences to step 40 to terminate the transfer operation.

The message transfer scheduling arrangement provides a number of advantages. First, it will be appreciated that the arrangement can be used in systems having a number of diverse configurations. For example, the operations described above as being performed by the host 10 or micro-controller can be equally performed by the micro-controller 11 or by one or more of the processing elements 13(i). Thus, the message transfer scheduling arrangement can be similarly useful in a system which does not have a host 10 or micro-controller 11. In addition, the message transfer scheduling arrangement can be useful in a system having interconnection networks 16 of diverse topologies, and diverse numbers of messages PE(x) MSG(y) to be transferred.

In addition, the message transfer scheduling arrangement can be useful in a system in which the numbers of messages PE(x) MSG(y) may vary as among the various processing elements 13(i), and in which the processing elements 13(i) may transmit messages generally without a single point of control and synchronization, such as that represented by the host 10 or micro-controller 11. In such a system, values for skew and roll parameters "U" and "W" will be generated for each processing element 13(i) independently of the others, based on the numbers "M(i)" of messages each processing element is to transfer. It will be appreciated that, if the values for the skew and roll parameters "U" and "W" are selected to be absolutely prime, that is, if their values are only divisible by the value "one," they will be relatively prime with any number "M" of messages to be transferred, unless the number "M" equals the values of parameters "U" and "W." Thus, in such a system, it may be advantageous to have each processing element 13(i) generate several absolutely prime numbers for use in the message transfer scheduling arrangement, and each processing element 13(i) may select among them when performing a message transfer operation, primarily to ensure that the values for the prime numbers selected as the skew and roll parameters "U" and "W" do not equal the number "M" of messages to be transferred during the operation.

As depicted in FIG. 1, the ordering of the messages in the sequential storage locations 15(i)(j) in memories 15(i), of the respective processing elements 13(i) generally corresponds to the ordering of the destination processing elements 13(j). Such an ordering is common for many types of message transfer operations, and the advantages provided by the composite roll and skew characteristic of the message transfer scheduling arrangement will be maximal in connection with such ordering. It will be appreciated, however, that the message transfer scheduling arrangement will also find similar advantages in connection with message transfer operations in which the orderings of messages are generally similar, but in which the strict ordering depicted in FIG. 1 is not maintained. Even when the message ordering in each memory 15(i) is completely random, except for the time to determine each new storage location 15(i)(j) for each iteration (step 37, FIG. 2), the message transfer scheduling arrangement would generally provide as rapid a transfer as having each processing element 13(i) transfer messages PE(x) MSG(y) from the storage locations 15(i)(j) in order.

In addition, the message transfer scheduling arrangement provides a relatively simple scheme for identifying each sequential storage location whose message is to be transferred. In Eqn. 2, above, the next storage location whose message is to be transferred is determined by a simple addition operation, using the roll parameter "W," and a conditional subtraction operation, using the number "M" of messages to be transferred. That is, in identifying the next storage location "$S_i$" whose message is be transferred, the processing elements 13(i) add the value of the roll parameter "W" to the identification of previous storage location "$S_{i-1}$", and subtract "M" if the sum exceeds the value "M." This operation is generally much simpler than other possible operations, such as random generation of storage location identifications. Other operations, such as random generation of storage location identifications may require other operations to guarantee that the particular storage locations are not identified twice within the data transfer operation, which, because of the limitations on the roll parameters "W," in particular, are not required here.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A computer system comprising a plurality of processing elements interconnected by a communications network, the communications network having a series of network addresses each associated with one of said processing elements, A. the communications network transferring messages transmitted by the processing elements in accordance with an address portion associated with each message, each address portion identifying a network address, the communications network transferring each message to one of said processing elements whose network address is identified by the message's address portion;

B. said processing elements during a message transfer operation, generating a series of messages and transmitting them over the communications network, each of said processing elements:

i. transmitting a first message whose address portion contains a network address which is a mathematical function of a skew parameter value and the processing element's network address, and ii. after transmitting the first message, transmitting successive messages having address portions containing successive network addresses following the first message's network address in the series, such that successive messages are associated with respective address portions which enable the communications network to transfer the messages to processing elements which have successive network addresses.

2. A system as defined in claim 1 in which the mathematical function is $S_0=Up \bmod M$ where $S_0$ is related to the network address for the address portion associated with the first message, "U" corresponds to the skew parameter value, "p" corresponds to the network address of the processing element generating the message, "M" corresponds to the number of messages to be transmitted by the processing element during the message transfer operation, and "mod" refers to a modulo function.

3. A computer system defined in claim 1 in which the series of network addresses has a network address range from a lower network address value to an upper network address value, with the series of network addresses sequencing from the lower network address value toward the upper network address value, p1 A. after successively transmitting messages respectively associated with address portions identifying network addresses in the portion of the network address range from the processing element's network address toward the upper network address value, each processing element continues successively transmitting messages respectively associated with address portions identifying network addresses in the portion of the network address range from the lower network address value toward the upper network address value.

4. A computer system as defined in claim 1 in which, for each processing element, the address portion associated with each message after said first message contains a network address which is a second mathematical function of a roll parameter value and a network address of the address portion associated with a message previously transmitted by said each processing element.

5. A computer system as defined in clam 4 in which the mathematical function is $S_t=S_{t-1}+W \pmod M$, where $S_t$ is related to the network address for the address portion associated with a message to be transmitted by the processing element, $S_{t-1}$ is related to the network address for the address portion associated with a message previously transmitted by the processing element, "W" represents the roll parameter value and "M" corresponds to the number of messages to be transmitted by the processing element during the message transfer operation, and "mod" refers to a modulo function.

6. A system as defined in claim 1 in which each processing element includes:
   A. a message generator for generating the series of messages to be transmitted during a message transfer operation, the message generator ordering the messages such that successive messages in the series are to be transferred to processing elements having successive network addresses; and
   B. a message transmitter for successively transmitting the series of messages generated by the message generator, the message transmitter selecting, as an initial message to be transmitted, a message having a message address which is the mathematical function of the skew parameter and the processing element's network address.

7. A system as defined in claim 6 in which, in each processing element:
   A. the processing element includes a memory having a plurality of storage locations identified by a series of memory addresses;
   B. the message generator stores messages generated thereby in the storage locations such that messages to be transmitted to successive processing elements are stored in storage locations having successive memory addresses; and
   C. the message transmitter retrieves messages from succeeding storage locations in the memory for transmission over the communications network, the message transmitters of processing elements which have successive network addresses selecting as initial storage locations those storage locations which have succeeding memory addresses.

8. A system as defined in claim 7 in which, in each processing element, the message transmitter includes:
   A. a storage location identifier portion including:
      i. a storage location identifier store for storing an address value that identifies a storage location whose message is to be transmitted;
      ii. an initial storage location identification generator for generating an initial storage location identification value for storage in the storage location identifier store to be used to identify an initial storage location,
      iii. a storage location identifier incrementation generator for incrementing the address value in the storage location identifier store;
   B. a transmission portion for retrieving the message in the storage location identifier by the storage location identifier and transmitting the retrieved message over the communications network, and
   C. a transmission controller for enabling:
      i. the initial storage location identification generator to use the skew parameter value to generate the initial storage location identification value and to store the initial storage location identification value in the storage location identifier store, and
      ii. the storage location identifier incrementation generator to increment the contents of the storage location identifier store; and
      iii. the transmission portion to operate to transmit a message from the storage location identified by the contents of the storage location identifier store as identified by the initial storage location identification value as generated by the initial storage location identification generator in the storage location identifier store and each incrementation by the storage location identifier incrementation generator.

9. A system as defined in claim 8 in which, for each processing element, the storage location identifier incrementation generator increments the address value modulo a value corresponding to the number of messages generated by the processing element's message generator.

10. A system as defined in claim 8 in which, in each processing element, the initial storage location identification generator generates the initial storage location identification value $S_0$ as $S_0=Up \bmod M$, where "U" corresponds to the skew parameter value, "p" corresponds to the processing element's network address, "M" corresponds to the number of messages generated by the processing element's respective message generator, and "mod" refers to a "modulo" function.

11. A system as defined in claim 10 in which the initial storage location identification generator further generates the initial storage location identification value $S_0$ as $S_0=WUp \bmod M$, where "W" is a roll parameter value.

12. A system as defined in claim 10 in which the initial storage location identification generator further generates the initial storage location identification value as a function of an initial offset value.

13. A system as defined in claim 12 in which the skew parameter value and the roll parameter value are both selected to be prime relative to the number of messages generated by each processing element.

14. A system as defined in claim 10 in which the transmission controller enables the storage location identifier incrementation generator to increment the contents of the storage location identifier store by an amount corresponding to the roll parameter value.

15. A system as defined in claim 14 in which, for each processing element, the storage location identifier incrementation generator, after incrementing contents of the storage location identifier store, generates the address value as the contents of the storage location identifier store modulo a value corresponding to the number of messages generated by the processing element's message generator.

16. A system as defined in claim 1 further including a host for controlling the processing elements to operate in parallel.

17. A method for use in connection with a computer system comprising a plurality of processing elements interconnected by a communications network, the communications network having a series of network addresses each associated with one of said processing elements, the communications network transferring messages transmitted by the processing elements in accordance with an address portion associated with each message, each address portion identifying a network address, the communications network transferring each message to one of said processing elements whose network address is identified by the message's address portion; at least some of said processing elements during a message transfer operation generating a series of messages and transmitting them over the communications network, the method of controlling at least some of said processing elements to generate messages for transmission during a message transfer operation comprising the steps wherein each of said at least some of said processing elements:

A. transmits a first message whose address portion contains a network address which is a mathematical function of a skew parameter value and the processing element's network address, and B. after transmitting the first message, transmits successive messages having address portions containing successive network addresses following the first message's network address in the series, such that successive messages are associated with respective address portions which enable the communications network to transfer the messages to processing elements which have successive network addresses.

18. A method as defined in claim 17 in which the mathematical function is $S_0 = Up \bmod M$ where $S_0$ is related to the network address for the address portion associated with the first message, "U" corresponds to the skew parameter value, "p" corresponds to the network address of the processing element generating the message, "M" corresponds to the number of messages to be transmitted by the processing element during the message transfer operation, and "mod" refers to a modulo function.

19. A method defined in claim 17 in which the series of network addresses has a network address range from a lower network address value to an upper network address value, with the series of network addresses sequencing from the lower network address value toward the upper network address value, A. after successively transmitting messages respectively associated with address portions identifying network addresses in the portion of the network address range from the processing element's network address toward the upper network address value, each processing element continuing to successively transmit messages respectively associated with address portions identifying network addresses in the portion of the network address range from the lower network address value toward the upper network address value.

20. A method as defined in claim 17 in which, for each processing element, the address portion associated with each message after said first message contains a network address which is a second mathematical function of a roll parameter value and a network address of the address portion associated with a message previously transmitted by said each processing element.

21. A method as defined in claim 20 in which the mathematical function is $S_{t=S_{t-1}} + W \pmod{M}$, is related to $S_t$ represents the network address for the address portion associated with a message to be transmitted by the processing element, $S_{t-1}$ is related to the network address for the address portion associated with a message previously transmitted by the processing element, "W" represents the roll parameter value and "M" corresponds to the number of messages to be transmitted by the processing element during the message transfer operation, and "mod" refers to a modulo function.

\* \* \* \* \*